Feb. 16, 1960 R. J. GEHRKE 2,924,936
PROPELLANT PROPULSION SYSTEM FOR HELICOPTERS
Filed Dec. 29, 1954
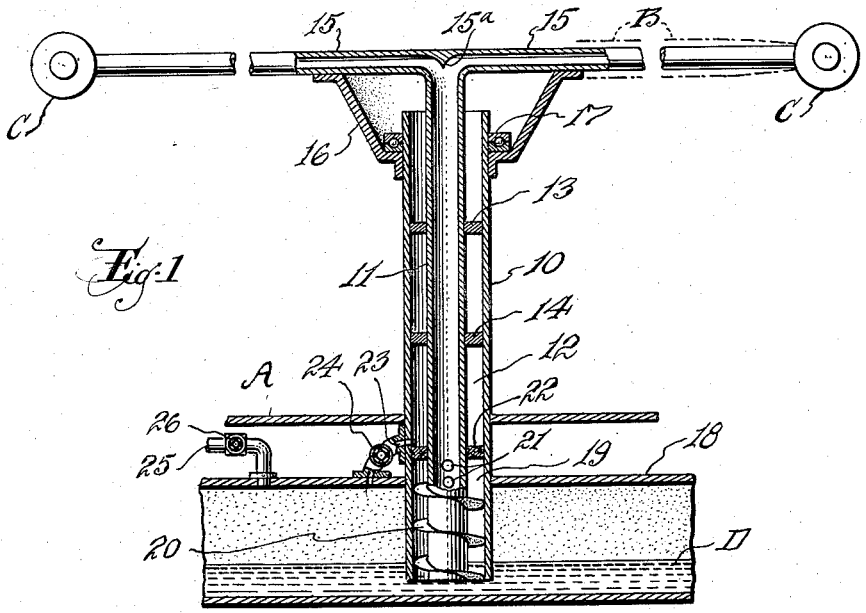
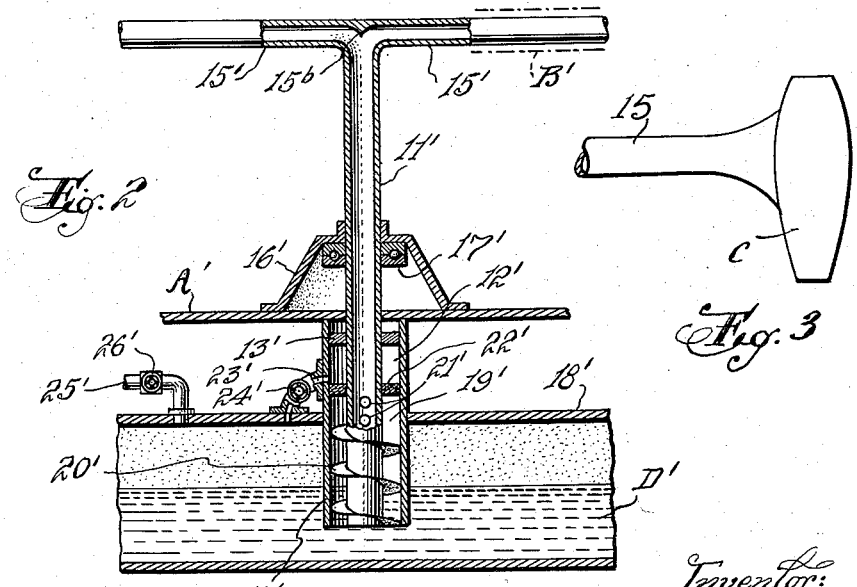
Inventor:
Richard J. Gehrke
By William R. Wright
Agent

United States Patent Office 2,924,936
Patented Feb. 16, 1960

2,924,936

PROPELLANT PROPULSION SYSTEM FOR HELICOPTERS

Richard J. Gehrke, Chatham, N.J., assignor, by mesne assignments, to Thiokol Chemical Corporation, a corporation of Delaware Application December 29, 1954, Serial No. 478,350

2 Claims. (Cl. 60—39.35)

The present invention relates to propellant feed systems for helicopters of the type wherein the airfoil rotors are driven by small reaction-type propulsive units mounted exteriorly of the aircraft fuselages for revolution with the airfoil rotors about their rotational axes.

In a helicopter of this type, numerous structural and operational problems are involved in delivering the liquid propellant from a fuselage-carried supply tank through the central rotor column and hub outward to the whirling propulsive units in an efficient and reliable manner. The delivery conduit must be leakproof; the delivery rate must be adequate to meet consumption requirements; and, since the present trend is toward simplicity and lightness in helicopter design, the entire feed system should be extremely compact and simplified in construction.

With the foregoing considerations in mind, it is the principal object of the present invention to provide a propellant conduit for the airfoil rotor which is unitary in structure from supply tank to propulsive units with no relatively movable sections outside the fuselage to present leaky joints which would reduce the economy of propellant supply and might even become a hazard when certain kinds of propellants are used.

Another object is to provide improved and extremely simplified propellant pumping means which utilizes the unitary conduit structure as means by which driving power may be transmitted directly from the propulsive units to the pumping means, whereby the propellant will be delivered at a volumetric rate directly proportionate to the rotational velocity of the rotor.

A further object is to provide a propellant feed system wherein the means for forcing the propellant from the supply tank through the delivery conduit to the propulsive units cooperatively combines sequentially applied component forces to include the initial effect of a pressurized supply tank, the secondary effect of positively driven pumping means, and the final effect of centrifugal force generated by the airfoil rotor.

Other objects, advantages and features of the invention will become apparent as the following specific description is read in connection with the accompanying drawing, in which:

Figure 1 is a fragmentary elevational view, partly in section, of one embodiment of the improved propellant feed system installed in a helicopter;

Figure 2 is a similar view of a modification of the same; and,

Fig. 3 is a fragmentary plan view of one of the propulsive units.

In accordance with current practice, the exteriorly located reaction-type propulsive units which the proposed propellant feed system is intended to serve are either mounted on the tips of the airfoil rotor blades or on rigid power arms that radiate from the rotor shaft below the level of the blades. The new feed system is equally well adapted for use with either of these alternative modes of mounting and propulsive units and either application is to be understood to be within the spirit of the present invention. Moreover, the system is capable of serving propulsive units of any reaction type, such as ramjet engines and rockets, and any such use is also embraced within the spirit of the invention.

Before referring in detail to the accompanying drawing, it may be explained that representation therein of those parts of the helicopter most closely associated with the new propellant feed system is relatively diagrammatic and fragmentary in order not to confuse structural features of the claimed invention with conventional aircraft structure. For instance, the outline of one airfoil blade is traced in dot-and-dash lines merely to indicate the general arrangement of the radial branch conduits of the propellant feed system inside the rotor blades as contemplated when the propulsive units for the respective blades are tip-mounted. All other conventional operational parts or mechanisms ordinarily applied to the blade roots, such as means for cyclic pitch change and the like, have been omitted from the disclosure because they are only necessarily incidental to the present invention and are not claimed as essential elements thereof.

Referring now to the embodiment of the invention disclosed in Figure 1, it will be observed that the propellant feed system includes as its basic structural element the vertically extending tubular housing 10 which is joined rigidly and securely as by welding or other sufficiently strong means, to the airframe of the helicopter indicated at A. The reason why a strong joint is important is that housing 10 very likely will have to support the entire weight of the aircraft and its load from the lifting rotor. In other words, housing 10 may constitute the mast which serves as rotary mounting means for the airfoil rotor column or shaft, which, in accordance with the present invention, is made tubular in construction in order that it may be utilized as the main conduit section of the proposed new propellant feed system. This shaft, which is designated by the numeral 11, is rotatably mounted coaxially within housing 10 and preferably is sufficiently smaller in diameter than the latter to provide an annular space 12 therebetween of predetermined radial extent for a particular purpose to be described presently. Any suitable means for rotatable mounting of shaft 11 within housing 10 may be employed, but the upper and lower annular bearings 13 and 14 located in the upper region of space 12 have been chosen for purposes of convenient illustration.

The upper end portion of shaft 11 is shown as protruding from housing 10 and provided at its extremity with a pair of diametrically aligned tubular arms 15—15 formed integral therewith. The number of arms obviously will conform to the number of airfoil rotor blades B when the propulsive units C are tip-mounted, but may be of any selected number when units C are independently mounted. In either adaptation, arms 15—15 are communicably connected to the hollow interior of shaft 11 at their inner ends and to the propulsive units C at their outer ends in order that these arms may function as branch propellant conduits. At the juncture of arms 15—15 with shaft 11, an upwardly diverging deflector formation 15a has been provided inside shaft 11 in closing relation to its upper extremity to divide the propellant stream and to direct its branches into the respective branch conduits.

Arms 15—15 are shown as being extended radially outward through blades B from the roots thereof to the tip-mounted fuel-consuming propulsive units C, to the propellant intakes of which they are communicably connected in any conventional manner. It is to be understood that under some circumstances it may be desirable to make the outer end portions of arms 15—15 flexible instead of rigid, as presently shown. Obviously, when the propulsive units are independent of direct supported connection with the rotor blades, arms 15—15 will be completely rigid in order to serve as supporting means for these units and also as power arms.

In order that rotor blades B may support the weight of airframe A and its load through the medium of housing 10, a hub structure 16 of any conventional construction is formed integral with arms 15—15, as by welding, and joined directly to housing 10 by an antifriction thrust bearing 17, which may be of any desired type.

The lower portion of housing 10, which is located within airframe A, is sealed hermetically in penetrating relation to the top wall of a propellant supply tank 18 and has its open lower end extending to a position in close proximity to the bottom of the tank in order that it will be immersed at all times in any propellant contents D thereof.

The lower end portion of space 12, which intervenes between the opposed inner and outer peripheral surfaces of housing 10 and shaft 11, is utilized as a working chamber 19 for propellant pumping means 20. This pumping means preferably is in the form of a lifting screw affixed to, or otherwise made rigid with, shaft 11. The direction of helical twist of the screw should be so related to the normal direction of rotation of shaft 11 caused by operation of rotor blades B that propellant liquid entering the lower end of housing 10 will be drawn upward into the latter. Immediately above pumping screw 20, plural port openings 21 are provided in the wall of shaft 11 to permit flow of propellant from working chamber 19 into the interior of the shaft. In order to seal space 12 immediately above openings 21 and thereby resist undesired flow of propellant in by-passing relation to the upper region of the main conduit afforded by shaft 11, a stuffing box conventionally represented at 22 is provided. Because slight leakage through stuffing box 22 may occur with wear, a drain duct 23 has been provided to lead from space 12 immediately above the stuffing box back into the top of tank 18. To permit the drain duct to be shut off while pressurizing tank 18 under operational conditions to be described later herein, the former is controlled by valve means 24. As shown in Figure 1, a pressure line 25 leading from any convenient source of compressed gas (not shown) is connected with the interior of tank 18 at the top thereof. Valve means 26 is provided in pressure line 25 to permit control and shutting-off of the pressure.

In the operational use of the new propellant feed system, it may be necessary initially, when starting the propulsive units, to pressurize tank 18 so that the propellant will be forced upward through the main conduit of shaft 11 and outward through the branch conduits of arms 15—15 to the respective propulsive units. Thereafter, when shaft 11 is rotating under the driving power of the propulsive units, pumping screw 20 will force the propellant upward through the main conduit in shaft 11 until its stream reaches the level of arms 15—15 and is divided by deflector 15a into lateral branch streams flowing radially outward into the branch conduits formed by arms 15—15. Under the influence of centrifugal force generated by revolution of propulsive units C and arms 15—15, further progress of the propellant will be motivated within the branch conduits. It should be apparent that the feeding of propellant to the propulsive units will be at a volumetric rate directly proportionate to the rotational velocity of the airfoil rotor, which should insure a constantly adequate supply to meet consumption requirements. Moreover, with a unitary structure of main and branch conduits such as has been devised, the possibility of leakage at any point between the supply tank and the propulsive units is very remote.

The structure of the modified form of feed system disclosed in Figure 2 differs from that of Figure 1 in the shortening of housing 10' to bring it entirely within the interior of airframe A' and in the lowering of hub 16' on shaft 11' into contact with, and attachment to, the airframe. With this change, the weight of the airframe and its load will be supported by shaft 11' through antifriction thrust bearing 17'. An advantage of this modification is to reduce the over-all weight of the construction, which is particularly desirable when arms 15'—15' become power arms for direct support of propulsive units independent of rotor blades B'. Similar to the details of construction disclosed in Figure 1, a deflector formation 15b is located at the upper end of the main conduit. The lower end of shaft 11' is journaled in a single bearing 13' in housing 10' and pumping screw 20' is affixed to its lower end portion within working chamber 19', which latter is divided from the superposed portion of space 12' by sealing means in the form of stuffing box 22'. The top wall of supply tank 18' is connected by drain duct 23' to space 12' immediately above stuffing box 22' and is controlled by valve means 24'. Openings 21' provide communication between working chamber 19' and the interior of the main propellant conduit constituted by shaft 11'. Tank 18' is provided with pressure line 25' controlled by valve means 26'.

While a helical pumping screw is disclosed herein as a preferred embodiment of the invention, a centrifugal impeller or other rotary type of pump could be employed without departing from the spirit of the invention.

While there have been shown and described and pointed out the fundamental novel features of this invention as applied to only two physical embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A fuel feeding system for delivering fuel from a supply tank to a plurality of propulsion units for combustion therein to effect rotation of the units about a vertical axis comprising a stationary tubular housing concentric with the axis and having a sealed connection with and extending into the tank to a point adjacent the bottom thereof, a unitary fuel conduit rotatably mounted coextensively and coaxially with and within said housing and extending therethrough and having integral branch conduits radiating therefrom and connected to and supporting the propulsion units, annular sealing means mounted between said fuel conduit and said stationary housing in spaced relation to the lower ends thereof, port openings formed in said fuel conduit below said sealing means to afford communication between said housing and said rotating fuel conduit for fuel flow into the latter, and rotary pumping means coextensive with and fixed to the rotatable fuel conduit below said ports to pump fuel from the tank through said housing and said ports into said rotatable fuel conduit and through said integral branch conduits to the propulsion units for combustion therein upon rotation of said fuel conduit.

2. The invention defined in claim 1 wherein the pumping means for the rotating fuel conduit is in the form of a screw affixed to said conduit for rotation therewith.

References Cited in the file of this patent

UNITED STATES PATENTS

| | | |
|---|---|---|
| 975,526 | Hood | Nov. 15, 1910 |
| 1,428,238 | Keating | Sept. 5, 1922 |
| 2,142,601 | Bleecker | Jan. 3, 1939 |
| 2,214,027 | McClammy | Sept. 10, 1940 |
| 2,238,502 | Muir et al. | Apr. 15, 1941 |
| 2,263,864 | Avigdor | Nov. 25, 1941 |
| 2,362,922 | Palm | Nov. 14, 1944 |
| 2,371,687 | Gerhardt | Mar. 20, 1945 |
| 2,424,285 | Piccardo et al. | July 22, 1947 |
| 2,445,856 | Mayer | July 27, 1948 |
| 2,509,359 | Margolis | May 30, 1950 |
| 2,544,907 | Wilson | Mar. 13, 1951 |
| 2,690,809 | Kerry | Oct. 5, 1954 |
| 2,710,067 | Sforza Del Pesaro | June 7, 1955 |

FOREIGN PATENTS

| | | |
|---|---|---|
| 478,747 | Italy | Mar. 4, 1953 |